F. H. BANCROFT.
AUTOMATIC TURNING MACHINE.
APPLICATION FILED SEPT. 8, 1916.

1,323,569.

Patented Dec. 2, 1919.
8 SHEETS—SHEET 2.

F. H. BANCROFT.
AUTOMATIC TURNING MACHINE.
APPLICATION FILED SEPT. 8, 1916.

1,323,569.

Patented Dec. 2, 1919.
8 SHEETS—SHEET 3.

Fig. 3.

Inventor:
Frank H. Bancroft,
by Roberts Roberts & Cushman
Attorneys.

F. H. BANCROFT.
AUTOMATIC TURNING MACHINE.
APPLICATION FILED SEPT. 8, 1916.

1,323,569.

Patented Dec. 2, 1919.
8 SHEETS—SHEET 5.

Inventor:
Frank H. Bancroft,
by Roberts Roberts & Cushman
Attorneys.

UNITED STATES PATENT OFFICE.

FRANK H. BANCROFT, OF GARDNER, MASSACHUSETTS, ASSIGNOR TO P. DERBY & COMPANY, OF GARDNER, MASSACHUSETTS, A CORPORATION OF MASSACHUSETTS.

AUTOMATIC TURNING-MACHINE.

1,323,569. Specification of Letters Patent. Patented Dec. 2, 1919.

Application filed September 8, 1916. Serial No. 119,145.

*To all whom it may concern:*

Be it known that I, FRANK H. BANCROFT, a citizen of the United States, and resident of Gardner, in the county of Worcester and State of Massachusetts, have invented new and useful Improvements in Automatic Turning-Machines, of which the following is a specification.

This invention relates to an automatic turning machine and more particularly to a machine for receiving blocks of wood or other material into a magazine, automatically boring centering holes in opposite ends of the blocks as they are fed downwardly through the magazine, automatically inserting the blocks between the respective head and tail spindles of a revolving carrier, performing two or more cutting operations on each block as the barrel is intermittently rotated, and automatically discharging the finished product from the machine.

In my improved machine a plurality of pairs of head and tail spindles are mounted upon an intermittently rotating carrier and as the carrier is stepped around each pair of spindles is successively brought into the following eight positions: First, into position to receive a piece of stock from the feed mechanism; secondly, into an idle position; thirdly, into the position where the first rough cutting operation is applied to the stock; fourthly, into the position where the second cutting operation is applied to the stock; fifthly, sixthly and seventhly, into idle positions; and eighthly, into the position where the turned article is discharged. As each pair of spindles is advanced from the seventh to the eighth position, one or both ends of the turned article are sawed off, thus releasing the article from the spindles. As each pair of spindles is advanced from the eighth to the first position the tail spindle is longitudinally withdrawn to receive a new piece of stock and between the first and second positions the tail spindle is forced forwardly to tightly secure the new piece of stock between the two spindles.

It is to be understood that the number of positions depends upon the number of pairs of spindles, and that the machine herein disclosed, having eight pairs of spindles and eight positions of rest during one complete intermittent revolution, is merely one illustration of the application of my invention. Furthermore, it is to be understood that the number of steps between the various operations may be varied, that additional cutting or other operations may be performed at stationary or intermediate positions, that only the same number of positions of rest in a single revolution may be provided as there are operations to be performed, and that various other modifications may be employed within the scope of my invention.

One object of the invention is to provide means whereby two or more cutting or other operations may be performed on the stock in a machine of the character described, for example, a rough cutting operation and at least one finishing operation. Another object is to improve the feed mechanism whereby the pieces of stocks may be rapidly and accurately transferred from the magazine to the turning spindles and more particularly to provide feed mechanism comprising rotating rather than reciprocating parts. A further object is to provide cam mechanism for longitudinally withdrawing one spindle of each pair of spindles a small distance as the pair is being stepped from the discharging position into receiving position, whereby a new piece of stock may be introduced between the spindle S, and to provide other cam mechanism to force the spindle forward into the center hole of the new piece of stock tightly to secure the stock between the pair of spindles as they are advanced from the receiving position to the next position. A still further object is to provide improved means for sawing off one or both ends of the turned article at the end of the cycle of operation.

Other objects of the invention will be apparent from the following description and claims in connection with the accompanying drawings, in which,—

The particular embodiment of my invention illustrated in the drawings, comprises a base B mounted on a table T; a carrier mechanism for rotatably supporting a plurality of pieces of stock comprising a plurality of head spindles HS and a plurality of tail spindles TS mounted on shaft $S_3$; a magazine M for supplying pieces of stock S to the feed mechanism FM; boring mechanism BM arranged to make center holes in each piece of stock prior to its being taken from the magazine by the feed mechanism; and stepping mechanism SM arranged to intermittently rotate the carrier comprising the head and tail spindles.

Figure 7:
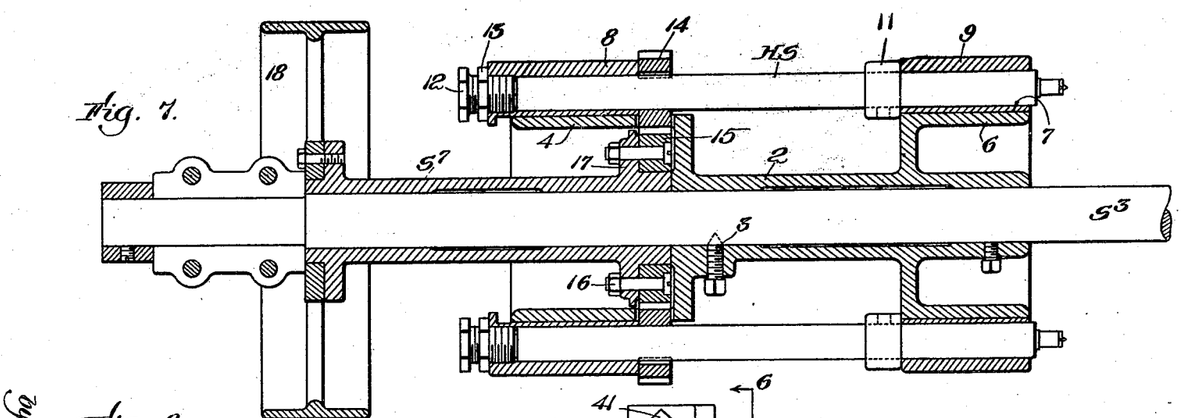
Fig. 7 is a longitudinal section of the head spindle mechanism.

*Carrier mechanism.*—The head spindle end of the carrier shown in section in Fig. 7 comprises a member 2 keyed to the shaft $S_3$ by means of a set screw 3 and comprising two flanged ends 4 and 6 each comprising eight flat exterior surfaces 7. On each pair of these surfaces is mounted a pair of blocks 8 and 9 in which is mounted one of the head spindles HS. On the head spindle is secured a collar 11 bearing against block 9 and within the left-hand end of the bearing block 8 is threaded a thrust bearing 12 held in adjusted position by a lock-nut 13. Each head spindle is arranged to be rotated at a velocity of the order of 1600 R. P. M. by means of a gear wheel 14 meshing with a gear wheel 15 secured by means of bolts 16 to the flange 17 on the hollow shaft $S_7$. Shaft $S_7$ surrounds shaft $S_3$ and is arranged to be rotated thereon by means of the pulley 18.

Figures 5, 6, 10:
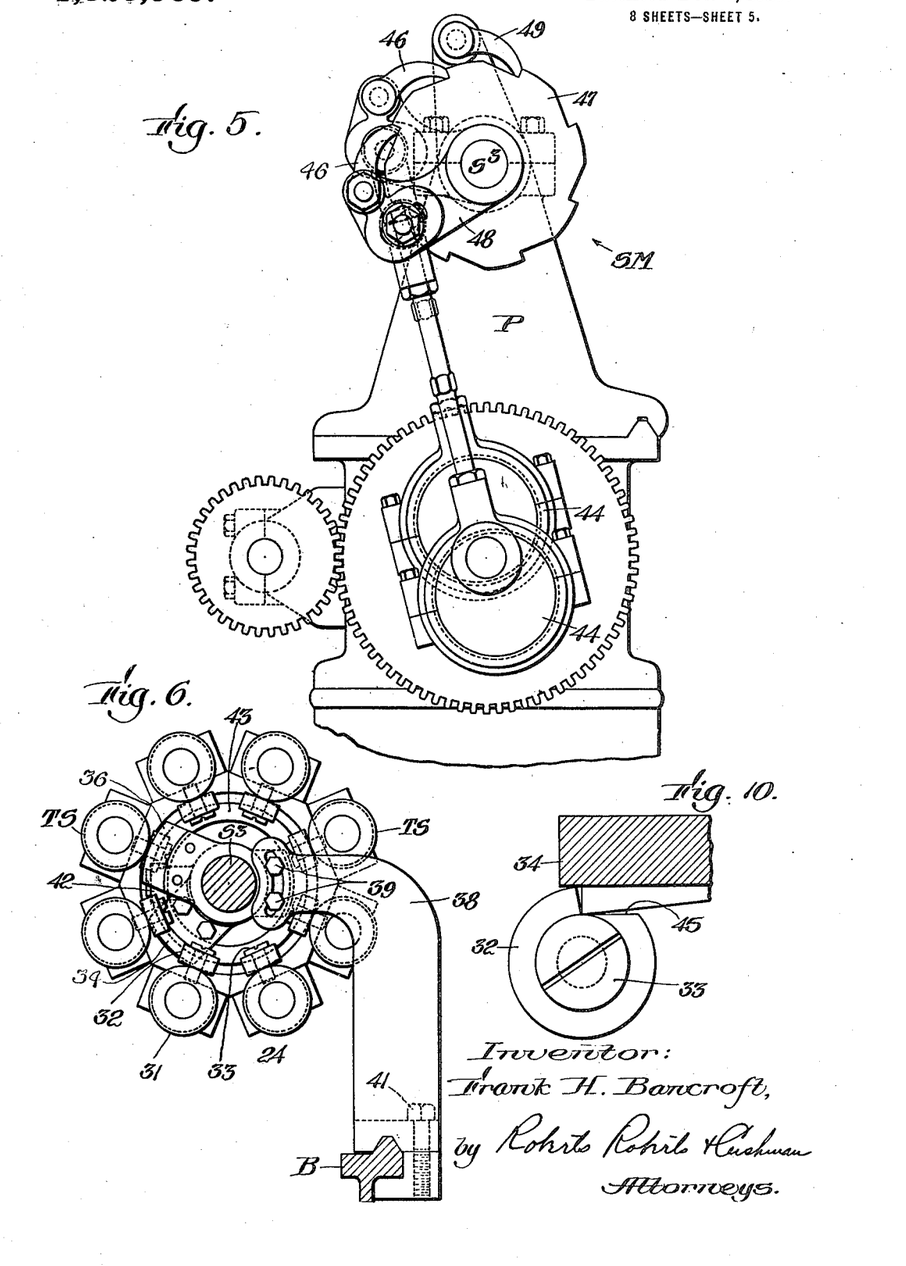
Fig. 5 is a right end elevation of the machine with portions omitted.
Fig. 6 is a vertical section taken on line 6—6 of Fig. 8 showing the tail spindles in elevation.
Fig. 10 is a detail view of the cam means for withdrawing each tail spindle.
Figure 8:
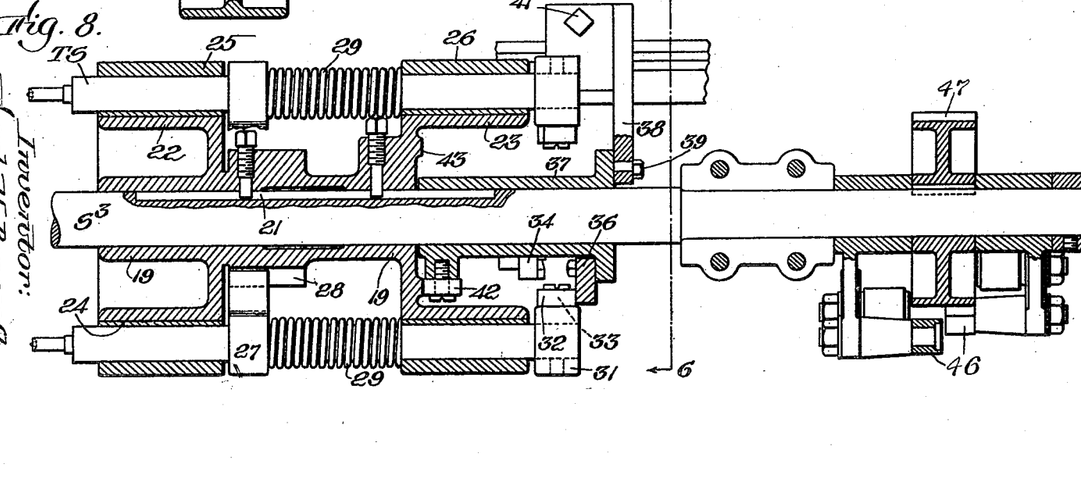
Fig. 8 is a horizontal sectional view of the tail spindle mechanism and the intermittent feed mechanism.

The tail spindle end of the carrier mechanism shown in section in Fig. 8 comprises a collar member 19 keyed to the shaft $S_3$ at 21 and comprising two flanges 22 and 23 each having eight flat external faces 24. Upon each pair of these parallel faces are mounted two blocks 25 and 26 having alined openings to receive the tail spindles TS. The tail spindles are prevented from rotating by means of members 27 coöperating with stops 28 mounted on collar 19 and the spindles are normally urged to the left by means of compression springs 29 mounted between blocks 26 and the members 27. Upon the right hand end of each tail spindle is rigidly mounted a collar 31 having a cam 32 secured to its inner face by means of a screw 33. These cam members 32 are arranged to coöperate with cam members 34 and 36 mounted upon bearing member 37 surrounding the shaft $S_3$. The member 37 carrying cam members 34 and 36 is held in position by means of a supporting arm 38 to which it is adjustably secured by bolts 39 as shown in Fig. 6. The support 38 is longitudinally adjustable on the base B and arranged to be held in adjusted position by fastening means 41. The member 19 is prevented from being forced to the left along the shaft $S_3$ by the pressure between the head and tail spindles by means of one or more rollers 42 mounted on collar 37 and coöperating with the annular bearing surface 43. The cam member 32 is preferably recessed at 45 as shown in Fig. 10 and the end of the recess is slightly tapered so that as the cam member 32 leaves cam 34 the tail spindle is quickly advanced by the spring 29. When the cams 32 are not provided with notches such as shown at 45 in Fig. 10 they may be either fixedly or rotatably mounted on the ends 31 of the tail-spindles, inasmuch as they are circular and have the same radius throughout their entire periphery, but when the cams are provided with notches 45 they are fixedly mounted on the ends of the tail-spindles.

Figure 4:
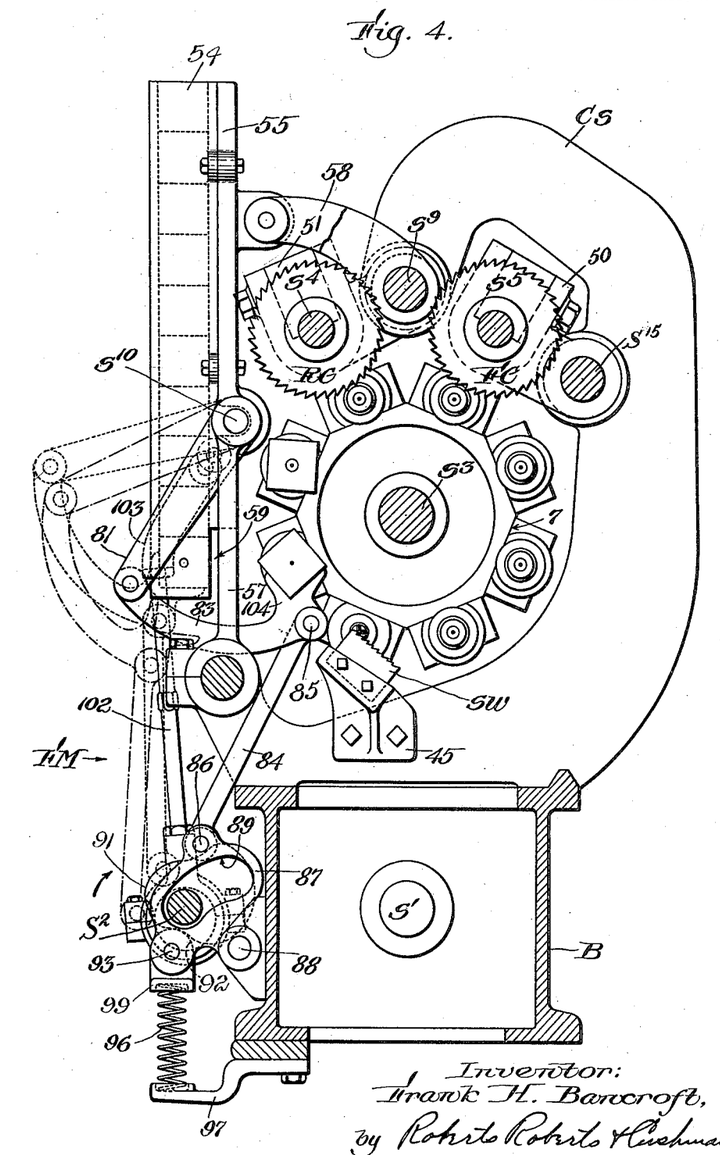
Fig. 4 is a vertical section taken on line 4—4 of Fig. 1.

*Stepping mechanism.*—The carrier, comprising the head spindle section shown in Fig. 7 and the tail spindle section shown in Fig. 8, both sections of which are keyed to the shaft $S_3$ as above explained, is arranged to be intermittently rotated by means of eccentrics 44 mounted on the left end of shaft $S_2$ and actuating pawls 46 which, in turn actuate the ratchet 47. The pawls 46 are pivotally connected to the shaft $S_3$ by means of connecting links 48 and are urged into engagement with the ratchet wheel by any suitable yielding means. A stop 49 is mounted on the left end pedestal P to hold the ratchet 47 in each advanced position. A saw SW is mounted on the cutter support CS by means of a bracket 45, as shown in Fig. 4, and is angularly disposed in the path of the stock, in advance of the stock receiving position of the spindles, to saw off the head spindle end of each piece of stock as the latter is moved past the position of the saw by the stepping mechanism.

A roughing cutter member RC and a finishing cutter member FC are provided to take roughing and finishing cuts respectively upon the stock as the latter is brought into operative position relative to the cutters by means of the carrier mechanism. The cutters are rotatably mounted on the cutter supports CS by means of connecting links 50 and 51 which are pivotally secured to the supports CS in such a manner that the cutter members can be radially adjusted relative to the stock carried by the carrier. The connecting links 50 and 51 are fitted tightly on the shafts $S_9$ and $S_{15}$ and the shafts $S_9$ and $S_{15}$ are in turn tightly mounted in the frame CS, these parts preferably being connected together by means of driving fits so that the parts are held in adjusted position. However, set-screws or other suitable means may if desired be employed to prevent rotation of the connecting links 50 and 51 about the shafts $S_9$ and $S_{15}$ respectively, and to prevent the shafts $S_9$ and $S_{15}$ from rotating in the frame CS.
The cutters are arranged to be rotated by pulleys 52 and 53, respectively, at a velocity of the order of 6000 R. P. M.

*Magazine.*—The magazine comprises two channel shaped members 54 vertically disposed and adjustably connected to the upright support 55 which is mounted on the base B by means of two legs 56 and 57 secured to shafts $S_7$ and $S_8$ and which is also connected to shaft $S_9$ by connecting links
58. The lower end of the magazine is provided with stops at either side to prevent the blocks of stock contained thereby from dropping out through the bottom thereof, and the rear flange of each upright channel member 54 is cut away at the lower end of the magazine as shown at 59 in Fig. 4, whereby the lowermost block may be rearwardly slipped out from under the stack of blocks in the magazine and be fed to the barrel mechanism BM by the feed mechanism FM hereinafter described.

Figure 1:
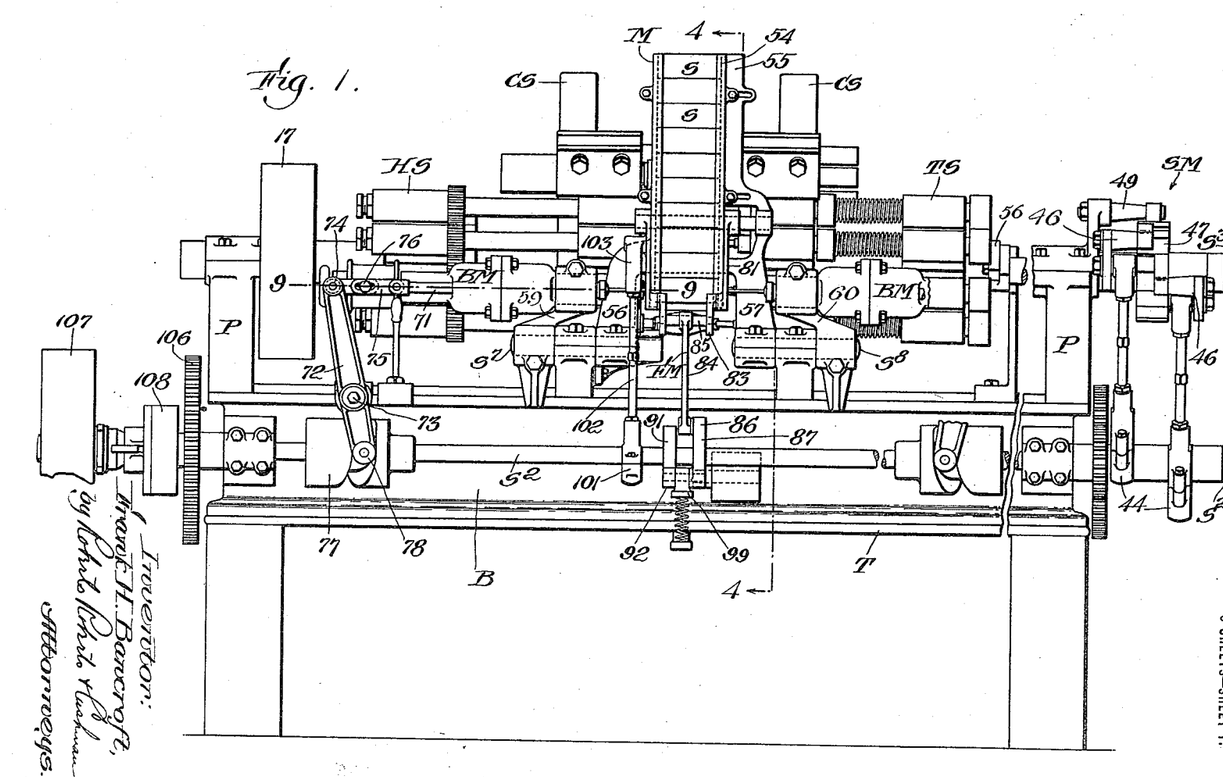
Figure 1 is a front elevation of the machine.
Figures 2, 9:
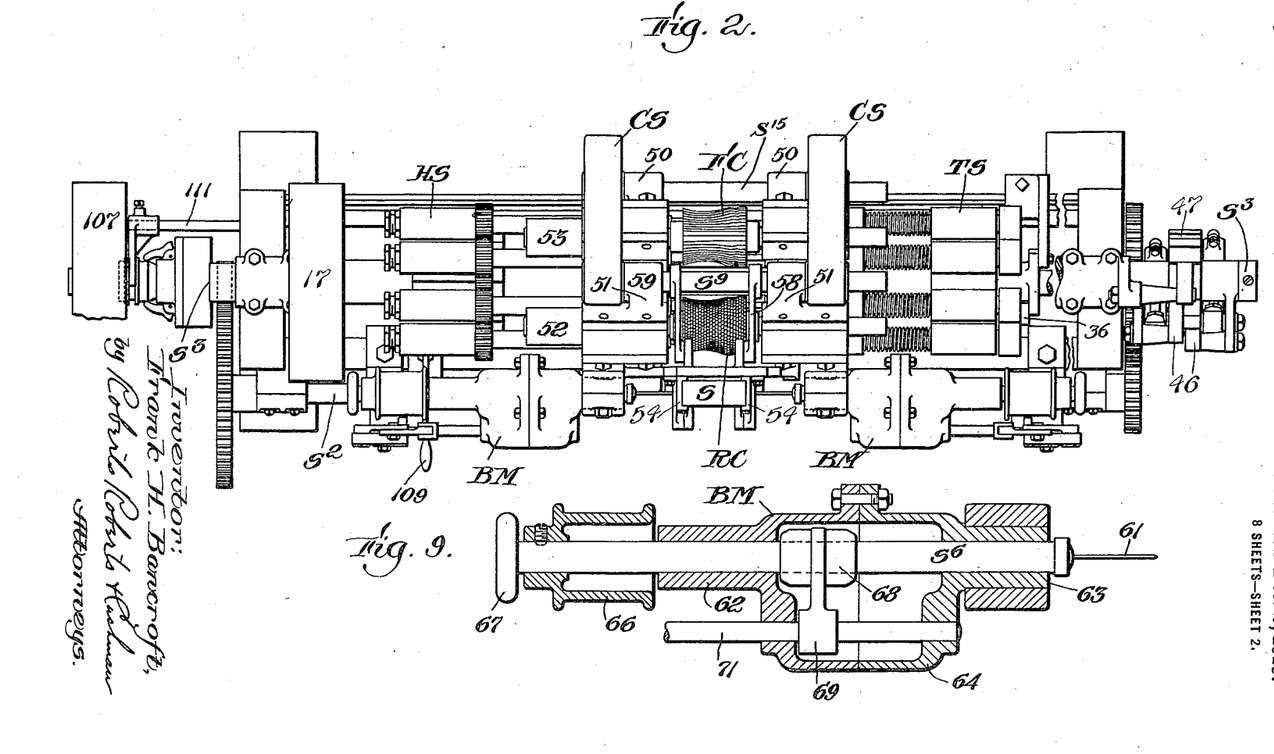
Fig. 2 is a plan view of the machine.
Fig. 9 is a horizontal sectional view of the boring mechanism taken on the line 9—9 of Fig. 1.
Figure 3:
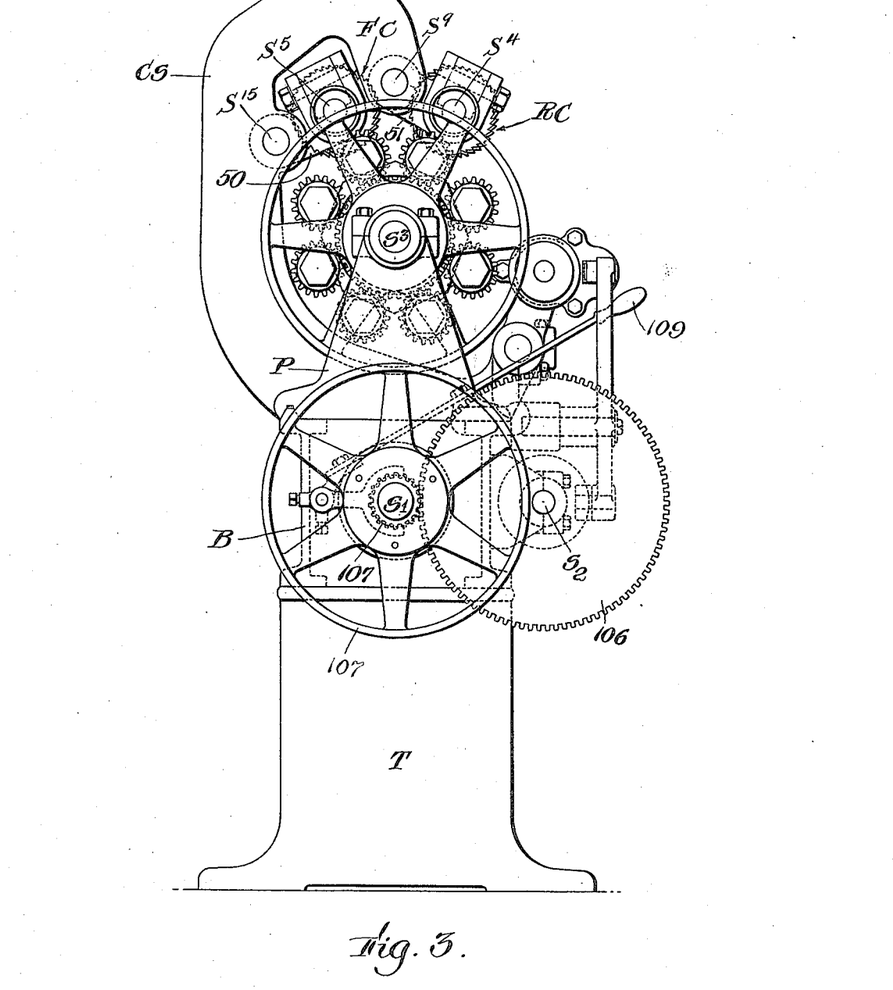
Fig. 3 is a left end elevation.

*Boring mechanism.*—The boring mechanism, shown in cross section in Fig. 9, comprises a boring tool 61 mounted on shaft $S_6$ rotating in bearings 62 and 63 of the casing 64. The shaft $S_6$ is arranged to be rotated by means of a pulley 66 and a handle 67 is provided at the end of the shaft opposite to the boring tool for reciprocating the shaft. The collar 68 is rigidly secured to the shaft within the casing 64 and the member 69 rigidly mounted on shaft 71 coöperates with a groove in the collar 68 to reciprocate the boring tool as the shaft 71 is reciprocated. One means for producing this reciprocation comprises an arm 72 pivoted at 73 to the base B and pivoted at 74 to the connecting link 75 which, in turn, is pivotally connected to the shaft 71. The connecting link 75 comprises two parts connected together by means of a bolt and slot connection 76 whereby the depth to which the boring tool is inserted into a piece of stock may be varied. The arm 72 is oscillated back and forth by means of a cam 77 mounted on shaft $S_2$ and coöperating with the cam roller 78 mounted on the lower end of the oscillating arm 72. The two boring mechanisms employed to bore the respective center holes for the head and tail spindles are identical except in that they occupy reversed positions as shown in Fig. 1 and the mechanisms are supported upon shafts $S_7$ and $S_8$ by members 59 and 60, respectively.

*Feed mechanism.*—The feed mechanism FM comprises two arms 81 pivotally mounted on shaft 82 and pivotally connected respectively to arcuate arms 83. At their forward ends the arms 83 are connected together by a short shaft 85. A connecting link 84 is pivotally connected at one end to the shaft 85 and at its opposite end it is pivotally connected at 86 to a member 87 which, in turn, is pivotally mounted at 88 on the base B. An opening 89 is provided in the member 87 to receive the shaft $S_2$, the opening being just large enough to permit the member 87 to oscillate back and forth about pivot 88 without engaging the shaft. The feed mechanism is actuated by means of the cam member 91 keyed to the shaft $S_2$ and positioned to engage a roller 92 mounted on the shaft 93 rigidly secured in the lower end of the oscillating member 87. The cam member 91 has the general contour shown in Fig. 4 and engages the upper side of the roller 92 to force the oscillating member 87 downwardly against the action of spring 96 mounted on a projection 97 secured to the under side of the base B, the upper end of the spring coöperating with a stop 99 pivotally mounted on the shaft 93 between roller 92 and oscillating member 87. The feed mechanism is further actuated by means of an eccentric 101 mounted on the shaft $S_2$ and pivotally connected with the left-hand arm 81 by links 102 and 103.

The mechanism for actuating the feed members 83 is so designed and so positioned on the shaft $S_2$ as to move the feed arms 83 rearwardly and downwardly (Fig. 4) from the full line position to the dot and dash line position in which position the notched ends 104 of arms 83 are immediately beneath the magazine. The notched ends 104 are then moved upwardly to engage the lowermost block and thence are moved forwardly to slide the block out from the magazine through opening 59 and position it in the solid line position. The shaft $S_2$ is driven by means of a gear wheel 106 meshing with gear 107 on shaft $S_1$, and the shaft $S_1$ is arranged to be driven by the pulley 107 which may be disconnected therefrom by means of a clutch 108 controlled by a handle 109 connected with the clutch by means of a connecting arm 111.

Figure 11:
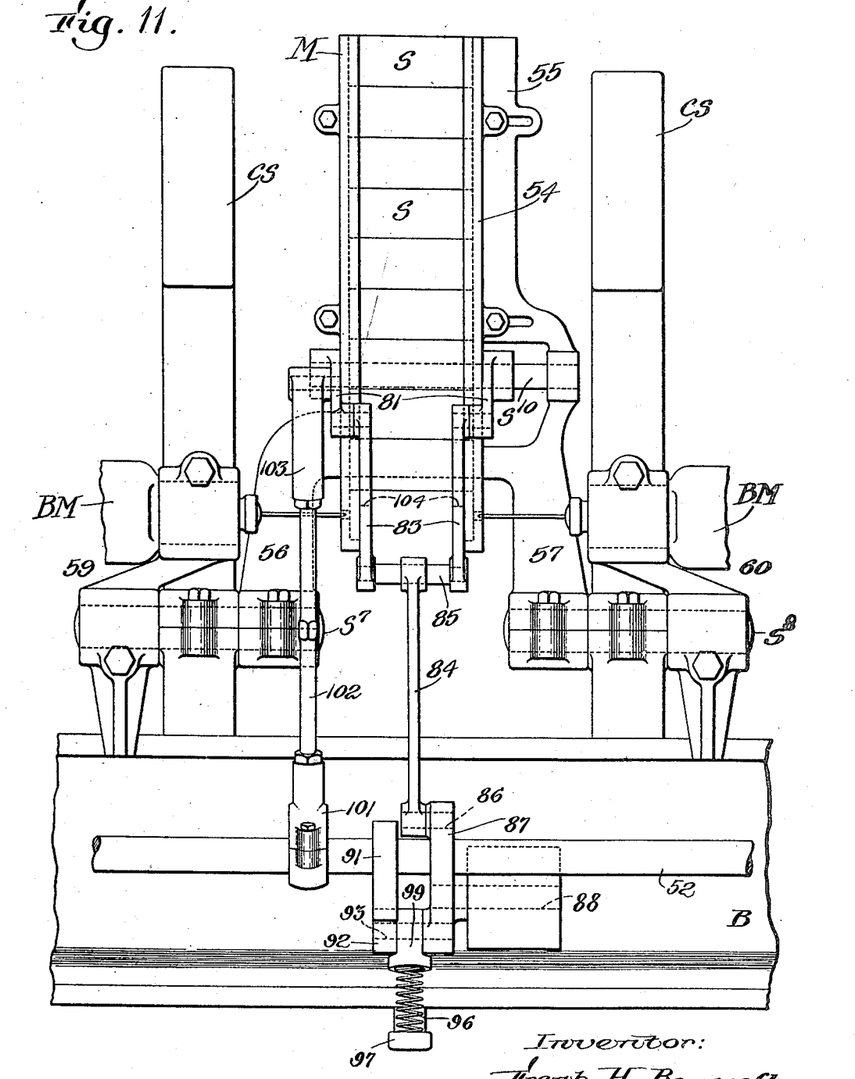
Fig. 11 is a front elevation of the feeding mechanism showing the mechanism on a larger scale and in a different position than in Fig. 1.
Figure 12:
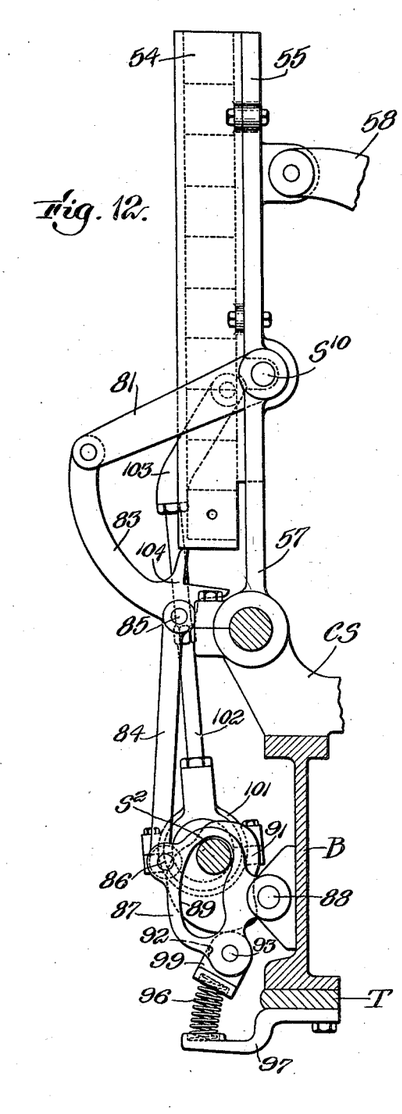
Fig. 12 is an end view of the feeding mechanism corresponding to Fig. 4, the mechanism being shown in an intermediate position.
Figure 13:
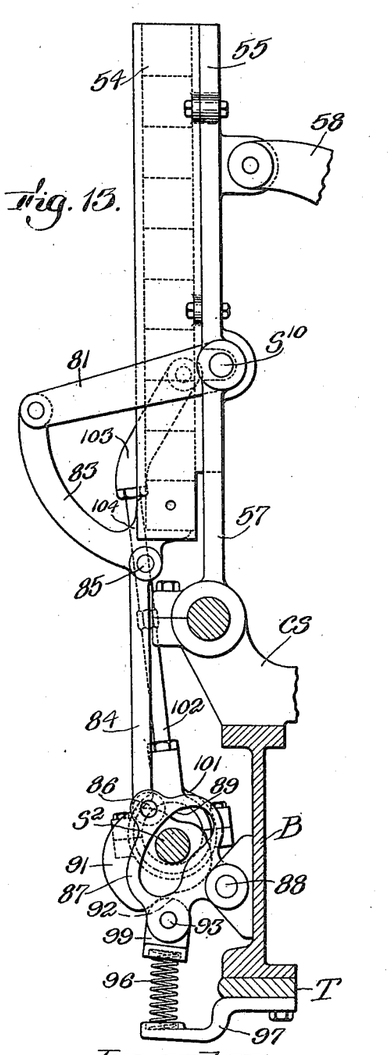
Fig. 13 is a view corresponding to Fig. 12 showing the feeding mechanism in the extreme rearward position indicated in Fig. 4 by dotted lines.

As more clearly shown in Figs. 11, 12 and 13, the feeding mechanism comprises two arms 81 pivotally mounted at the opposite sides of the magazine M on shaft $S_{10}$ and arcuate arms 83 pivotally mounted at their upper outer ends to the free ends of the arms 81. The arms 81 have notches 104 in their forward ends which are adapted to fit around the pieces of stock. By swinging the arms 83 about the shaft $S_{10}$ they may be brought rearwardly into the position shown in Fig. 13, where the notch 104 fits around a block in the bottom of the magazine, and by swinging them forwardly the block engaged by the notches 104 may be pushed forwardly out of the magazine and carried into the position shown in Fig. 4. When the arms 83 are swung rearwardly to bring them from the position shown in full lines in Fig. 4 to the position shown in full lines in Fig. 13 the lower ends of members 83 must be swung downwardly along an arcuate path so that the upstanding portion of the notch 104 may pass beneath a block in the bottom of the magazine.

The arms 81 are caused to swing about the pivot $S_{10}$ by means of an eccentric 101 and connecting links 102 and 103 extending between the eccentric and one of the arms 81. The distance between the notch 104 and the pivot $S_{10}$ is varied as the arms 81 and 83 are swung by the eccentric 101 by means of the cam member 91, the cam member 91 bearing against the roller 92, which is mounted on the rocker arm 87, the rocker arm in turn being connected to the lower ends of arms 83 through the connecting link 84 and the shaft 85. The rocker arm 87 is normally urged upwardly by means of the spring 96, and the cam 91 operates in opposition to the spring 96. The notch 104 is caused to move downwardly beneath the lowermost block in the magazine during its travel rearwardly by virtue of the enlarged portion of the cam 91, which is directed downwardly in Fig. 12. After the notch 104 has cleared the lowermost block the large portion of the cam 91 leaves the roller 92 as shown in Fig. 13, thereby permitting the spring 96 to raise the notch 104 into the position shown in Fig. 13. The roller 92 then engages a portion of cam 91 of approximately constant diameter, so that the notch 104 is moved substantially straight forwardly by the eccentric 101 to carry the lowermost block out from the magazine, the member 84 pivoting about the stud 86 on the substantially stationary rock member 87.

*Operation.*—The blocks of stock are fed into the magazine M from the top, and out of the magazine at the rear side of the lower end thereof, as above described. Immediately after the lowermost block is fed out of the magazine and the next block drops to the bottom of the magazine, the two boring devices are advanced by the cams 77 to bore a center hole in each end of the next block. The feed mechanism then transfers the block from the magazine to the solid line position shown in Fig. 4 where it is received by a pair of spindles on the carrier in the manner now to be described.

As a pair of spindles is stepped into stock receiving position by the mechanism SM, the cam 32 on the end of the tail spindle engages the inclined face of cam member 34 (Figs. 6 and 8) whereby the tail spindle is longitudinally withdrawn a sufficient amount to permit the stock to be advanced into position between the head and tail spindles. The cam 34 is disposed in such angular position relative to the receiving position of the new piece of stock that when the receiving spindles are in alinement with the center holes thereof the spindle cam 32 leaves the inclined cam 34 and the tail spindle is plunged forward by its respective spring 29 whereby the new block is more or less tightly gripped between the head and tail spindles. In order to more deeply sink the driving edges of the head spindle into the stock the inclined cam member 36 is provided to engage the rear face of the spindle cam 32 as the pair of spindles are carried forward from the receiving position.

The stock is rotated by the head spindle as above explained and as it is stepped into operative position relative to the first tool RC the first operation, which may be a coarse cutting operation for example, is performed thereon, the tool being rotated in a direction opposite to that of the stock. The stock is then stepped into position to be subjected to the second operation, which may be a light finishing operation, for example. While only two tools have been illustrated, other tools for performing other operations upon the stock at subsequent positions of rest may obviously be employed if desired. The operation of the feed mechanism is so timed relative to the intermittent rotation of the carrier mechanism that a block is supplied to each pair of spindles in the receiving position.

As each piece of stock approaches the end of one complete revolution around the axis of the carrier mechanism, at least one end, and preferably the head spindle end, is cut off by the saw SW which is angularly disposed in the path thereof. Thus the turned article is permitted to drop from between the pair of spindles and as the barrel is stepped forward to bring the spindles into the stock receiving position, the tail spindle is withdrawn whereby a new piece of stock may be received by the said pair of spindles. The described cycle of operations is continuous and may yield turned articles at a rate of the order of 6000 per hour.

I claim:

1. A turning machine comprising a carrier, a plurality of opposed head and tail spindles for holding pieces of stock arranged in a circular row on said carrier, means to rotate said carrier about an axis concentric with said circular row of spindles and to rotate the pieces of stock about the respective spindle axes, and a saw stationarily mounted in the path of rotation of the stock about the carrier axis so as to cut the rotating stock in passing.

2. A turning machine comprising a carrier, a plurality of opposed head and tail spindles for holding pieces of stock arranged in a circular row on said carrier, means to rotate said carrier about an axis concentric with said circular row of spindles, and a saw fixedly mounted in the path of rotation of the stock about the carrier axis, the saw being disposed obliquely to the path of the stock so as to cut the stock in passing.

3. In a turning machine having a magazine and turning spindles, mechanism for feeding pieces of stock from the magazine to the spindles comprising a jointed arm, one section of the arm being pivotally supported and the other section having a stock engaging portions, means for oscillating said arm back and forth between the magazine and the spindles, and means for directing said other section of the arm transversely of the path of oscillation into stock receiving position and into stock delivering position.

4. In a turning machine having a magazine and turning spindles, mechanism for feeding pieces of stock from the magazine to the spindles comprising a jointed arm, one section of the arm being pivotally supported and the other section having a stock engaging portion, means for oscillating said arm back and forth between the magazine and the spindles, and means engaging said other section throughout its entire path of oscillation for moving said other section of the arm transversely of the line between the stock receiving position and stock delivering position.

5. In a turning machine having a magazine and turning spindles, mechanism for feeding pieces of stock from the magazine to the spindles comprising a jointed arm, one section of the arm being pivotally supported and the other section having a stock engaging portion, means engaging said one section for oscillating said arm back and forth between the magazine and the spindles, and means engaging said other section throughout its entire path of oscillation for directing said other section of the arm transversely of the path of oscillation into stock receiving position and into stock delivering position.

6. A turning machine comprising turning spindles, a magazine arranged to deliver pieces of stock from the bottom thereof, an arm consisting of two sections pivotally joined together, one of said sections have a stock support, a member projecting upwardly at the rear of said support to push stock from the magazine, means for pivotally supporting the other of said sections to oscillate said stock support back and forth between the magazine and the turning spindles, and means to move said one section transversely of its path of oscillation to bring the stock support beneath stock in the bottom of the magazine with said member behind the stock so that when the stock support is advanced the stock on the support is pushed from the magazine.

7. A turning machine comprising turning spindles, a magazine arranged to deliver pieces of stock from the bottom thereof, an arm consisting of two sections pivotally joined together, one of said sections having a stock support, a member projecting upwardly at the rear of said support to push stock from the magazine, means for pivotally supporting the other of said sections to oscillate said stock support back and forth between the magazine and the turning spindles, and cam mechanism for guiding said one section so that it is retracted along a path lower than its path of advancement whereby said member clears stock in the bottom of the magazine when retracting but engages the stock when advancing.

Signed by me at Boston, Massachusetts, this 2d day of Sept., 1916.

FRANK H. BANCROFT.